Patented Mar. 18, 1930

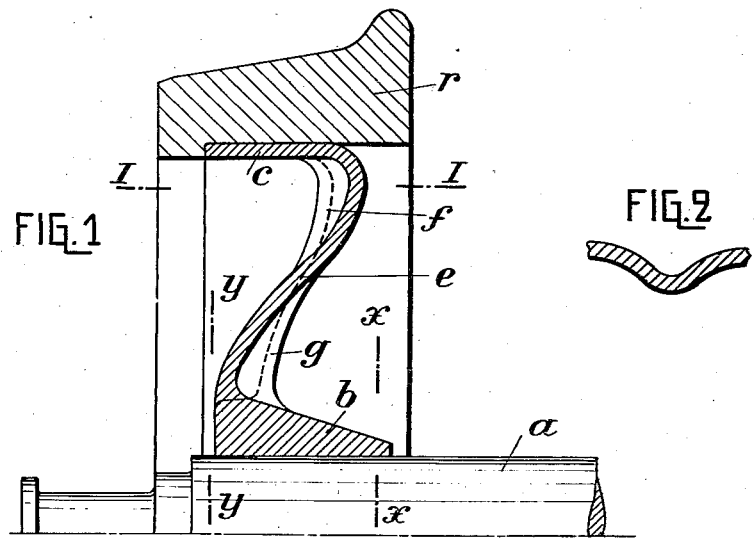
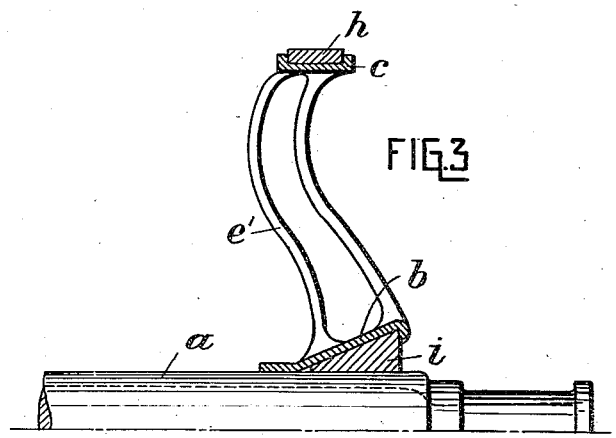

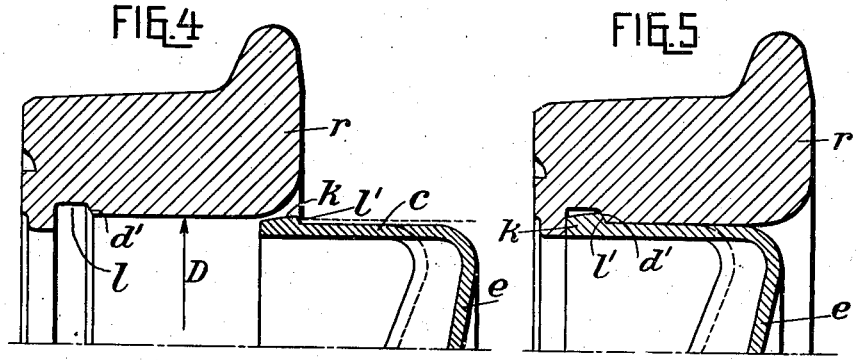
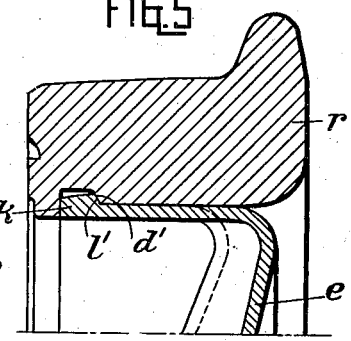
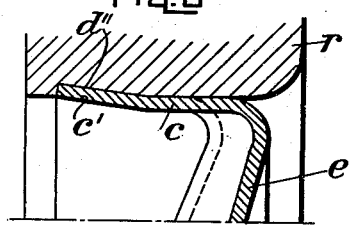
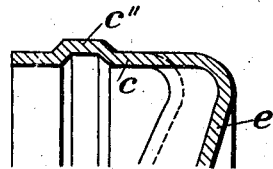
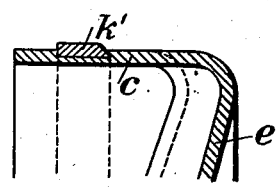
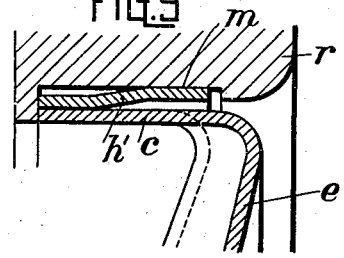
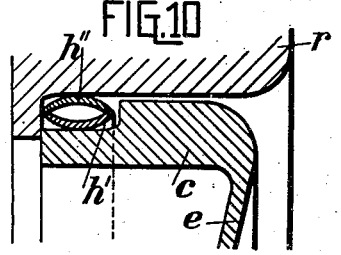
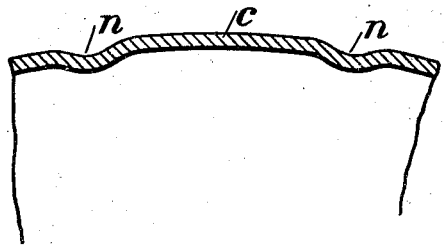

1,751,007

UNITED STATES PATENT OFFICE

ERNST KREISSIG, OF UERDINGEN-ON-THE-RHINE, GERMANY

WHEEL AND AXLE

Application filed June 11, 1929, Serial No. 370,089, and in Germany June 8, 1928.

The present invention relates to wheels and more particularly to wheels of railway vehicles wherein the hub of a wheel is adapted to be forced on to an axle and a tire to be forced on the rim thereof.

The object of the invention is to obtain a more reliable connection than heretofore between the wheel rim and tire and between the hub and axle.

For this purpose, the invention consists essentially in the feature that the rim and hub of the wheel are adapted to act as annular springs i. e. to allow of elastic radial deformation and to permit of this elastic deformation the rim and hub are connected together by a part of the wheel which has a curved axial cross-sectional shape which is therefore subjected to bending action by radial forces. This bending action as distinct from direct tension or compression does not interfere with the annular elasticity of the rim and hub.

The significance of the annular spring action for obtaining a permanent firm seat for the wheel tire and hub, which are shrunk on in a well known manner, is that an inelastic web or a web having only very slight elasticity is deformed in a substantially inelastic manner by the shrinkage of the hub and tire so that it is not able to prevent dangerous loosening of the tire and hub in operation as its reserve of elasticity is too small. On the other hand, the radial and tangential annular spring effect of the tire and hub is not restricted by the web or spoke construction according to this invention which, while resisting relative axial displacement of the hub and rim, is capable of elastic deformation in a radial direction.

The application of the invention to wheels and axles of rail vehicles is diagrammatically illustrated in the accompanying drawings in a number of embodiments.

In the drawings:—

Figure 1 is a cross-section through the upper half of a wheel, which may be a disc wheel or a spoked wheel, according to the invention.

Figure 2 is a horizontal cross-section along line I—I of Figure 1.

Figure 3 is a cross section through the upper half of a wheel according to a modification of the invention.

Figures 4 and 5 are cross-sections through a wheel tire with the upper part of the wheel disc of a third modification, Figure 4 before and Figure 5 after shrinking the tire on the rim of the disc.

Figures 6 to 8 show diagrammatically cross sections through modifications of the Figures 4 and 5.

Figures 9 and 10 are cross sections through the tire and the adjacent portion of the disc which illustrate modifications of the elastic ring provided between tire and rim according to Figure 3 of the drawings, and Figure 11 shows a section through the rim of the disc parallel to the vertical plane of the disc and illustrates diagrammatically a modified construction of the rim.

In Figure 1 which shows a wheel having a disc or web connection between the rim and hub, the hub $b$, disc $e$ and rim $c$ are all pressed out of one piece. The disc $e$ is substantially S-shaped in axial section, as can be seen from Figure 1. Such sinuous shape of the disc would not however, in itself possess sufficient elastic bending power for the annular spring action of the tire and hub, as in a disc curved solely in a radial direction the fibres of the material of each circumferential section extend in a closed circle or ring, similarly as in a plane disc, and bending of the arch or curve is therefore limited. When a disc, either plane or radially curved, is decreased in diameter, all concentric circular sections of this disc must more or less decrease in diameter. If therefore, a concentric ring cut out of such a disc is considered, this will experience a corresponding decrease in periphery owing to the decrease in diameter of the disc and consequently a tangential compression strain is set up. The latter however, stiffens the ring so that it can only yield radially to an exceedingly small extent. In order to avoid this result, tangential curved bulges or radial corrugations $f$ and $g$ are also formed in the disc $e$ (see Figure 2). The flat annular course of the fibres of the disc preventing the elastic bending is altered by these tangential curves or indentations of the disc $e$, so that tangential strains can practically only occur in the rim and hub, and not in the disc itself, so that the latter can undergo elastic bending to such an extent that it allows and assists the annular spring action on the rim and hub to the necessary degree. The corrugations $f$, $g$ at the same time increase the strength of the disc to resist relative axial movement of the rim and hub.

Instead of the bulges or corrugations, radial slots may be formed in the disc or similar means by which the tangential extent of the fibres is interrupted and the centre of the wheel thereby subjected mainly to bending strain by radial forces and thus the annular spring action of the tire and hub not impaired.

In the form of construction shown in Figure 3, each centre of the wheel has cast or forged spokes $e'$ which are subjected to bending strain on contraction of the rim owing to their curved axial section. The rim $c$ and hub $b$ are therefore not restricted in their tangential elasticity.

The pressures exerted on the axle of the hub are of course increased by the annular spring action. Particularly high transverse contraction strains are caused thereby, which add to the external loading on the axle, and it should be noted that these external loads in the section $y$—$y$ in Figure 1 are considerably less than in the section $x$—$x$, so that the transverse contraction stresses in the section $x$—$x$ cause a considerably greater danger of fracture of the axle than in the section $y$—$y$. In the form of construction shown in Figure 1 the hub $b$ is therefore tapered from the section $y$—$y$ to the section $x$—$x$, high contractional pressures existing in the first section $y$—$y$ i. e. in the least dangerous portion whereas only small constractional pressures occur in the dangerous section $x$—$x$, which causes an effective reduction of the load on the axle. A further advantage is a considerable reduction in weight which can be still further reduced by using hollow axles as shown in Figure 3.

In the form of construction shown in Figure 3, a very thin conical hub $b$ having a ring $i$ of relatively great elasticity positioned therein is used. The ring $i$ is made of high quality steel or similar material and greatly assists the annular spring action of the hub. It can either be rigidly connected with the hub or loosely positioned thereon and assumes the function of preventing axial displacement of the wheel on the axle, while the thin hub $b$ is only pressed on firmly enough to prevent any torsional movement between the axle and the centre of the wheel.

An elastic ring $h$ of high quality steel or similar material can also be used for the rim as in Figure 3, in order to increase the spring action of the rim.

The improved design of the hub also comes into account for other applications, where a wheel is shrunk or pressed on axles or shafts subjected to bending strains. As such a case may, for instance, be mentioned the mounting of the driving spur wheels on the axles of tramway carriages by shrinkage.

Preferably the web is also constructed of high grade material such as nickel steel or chrome-silicon steel of about 60 kg. per sq. mm. or 38 tons per sq. in. tensile strength, because the resiliency of the web is thereby still further increased.

To combine with simplicity of construction a reliable connection between tire and the web or disc, the rim $c$ of the web $e$ is, in the embodiment illustrated in Figures 4 and 5, provided with an annular collar $k$, which may be made upon the rim $c$ by pressing, welding or in any other suitable manner, and which has a greater diameter than the outer diameter of the rim $c$. In the tire $r$ there is provided a recess $l$ corresponding with this collar $k$. Assuming that $D$ is the diameter of the heated tire and that $f$ is the distance which the collar $k$ may be forced radially inwards within the elastic limit, the outer diameter of the collar may be $D+2f$. If now after the heating of the tire the cold wheel disc $e$ is forced into the tire $r$, the disc is compressed radially by the diameter expansion $2f$. As soon as the collar $k$ has arrived beneath the recess $l$, it will extend outwards according to Figure 5 and its face $l'$ will engage the face $d'$ of the tire recess. Both these faces are preferably bevelled. When the tire $r$ shrinks, the collar $k$ is forced radially into the recess $l$, so that an efficient lock against sliding results.

The collar $k$ may be replaced by a suitable construction of the wheel rim $c$ itself, as illustrated in Figure 6, where the collar $k$ of Figures 4 and 5 is replaced by the radial deflection or flaring $c'$ of the rim, which after the shrinking on of the tire $r$ engages a corresponding recess $d''$ in the tire.

In the embodiment of the invention illustrated in the Figures 7 and 8, the collar is axially displaced. In Figure 7 it is obtained by an annular rib-like extension $c''$ of the disc rim $c$ produced by expanding the rim or in any other manner, and in Figure 8 by a separate ring $k'$ inserted into a groove of the rim. It will be understood that the ring $k'$ might be as well provided in a recess of the tire instead of the disc rim, and that the entire arrangement could be reversed by the collars or keys being provided on the tire and the recesses or grooves being provided in the rim of the wheel disc. Instead of the annular recess and corresponding key, other members or elements of engagement between tire and disc rim might equally well be employed, and these members need not necessarily be complete circles, but might be sections only.

Although the above described modes of attachment of the tire to the rim are primarily suitable for wheels and axles constructed according to this invention they may also be applied to known types of wheels, for which they may be employed with equal success and to which it is desired to extend the protection.

The elastic ring $h$ according to Figure 3 arranged between tire and wheel rim may be given various forms and may, if desired, be constructed so strong or highly elastic that it not only prevents relative circumferential movement between tire and rim but it may also produce a radial spring action.

In the modification illustrated in Figure 9, this ring $h'$ has such a cross-section that it may be radially elastic, being depressed at its one side and expanded at its other side. In its unstressed condition its outer diameter is larger than the diameter of the annular recess $m$ of the tire $r$, and its inner diameter is smaller than the outer diameter of the rim $c$ of the centre portion or spider, so that it will elastically abut against the tire and the disc rim, when forced between them. For the purpose of obtaining a certain elasticity in operation, radial play may be provided between tire and rim but such play may be also avoided, if frictional contact only is desired. According to the design illustrated in Figure 10, a plurality of annular springs $h''$ may be employed simultaneously.

To assist the circumferential elasticity of the rim $c$, it may be provided with depressions $n$ according to Figure 11, which have an elastic action when subjected to bending strains and thus increase the elasticity of the rim of the wheel. This construction is of particular advantage for small wheels, in which no great power actions, but greater elasticity per unit of diameter is required.

Another feature of the invention for obtaining a permanently firm connection between tire and wheel disc or spokes consists in the fact that the loosening of the tire during the operation which is due to the different heating of tire and wheel disc, is eliminated by the compensating action of materials of suitably different heat expansion. In the known wheels and axles, the wheel disc spokes or the like consist of iron or steel, which have practically the same coefficient of expansion as the material of the wheel tire. If now due to continued braking action the tire becomes heated, this heating is only partly transmitted to the wheel disc, so that the latter becomes less heated and, therefore, expands less than the tire. The result is a loosening of the tire.

The invention provides a wheel disc or spokes or means situated between disc and tire, such as elastic rings of a material, which has a higher coefficient of expansion than steel or iron. Such materials are, for instance, bronze, brass, aluminum, and so on. The lower heating of the wheel disc then finds a compensation in the greater expansibility of the material of the disc or of the means interposed between the disc and the tire. The use of light metal for the disc results further in a high radial elasticity and a considerable saving in weight, which are also considerable advantages. It will be understood that the shrinking temperature of the tire must not be too high, when using light metal and that it might be advisable to cool the wheel disc during the application of the tire. Furthermore, it may be desirable to insert between the wheel disc and the tire a relatively thin layer of a material adapted to retard the transmission of heat from the tire to the disc.

Having now particularly described and ascertained the nature of my said invention and in what manner the same is to be performed, I declare that what I claim is:—

1. A wheel having a pressed out rim and boss in which, in order to secure good seating of a tire on the rim of the wheel and of the boss on the axle of the wheel, the rim and the boss are constructed to act as annular springs and are connected together by a web comprising either spokes or discs which are bent and provided with impressed or recessed portions or otherwise constructed so that they are subjected to a bending strain by radial forces and thus do not adversely affect the spring action of the rim and boss.

2. A wheel as claimed in claim 1 in which, in order to reduce to a minimum any subsidiary stresses set up in that section of the axle which sustains the greatest stresses due to external loading, the external diameter of the boss or the thickness of the wall of the boss is decreased towards said section.

3. A wheel as claimed in claim 1 in which the tire or the disc rim, respectively, is provided with a recess, for instance in the shape of an annular groove, and the other part is provided with a corresponding key-like projection, such that, when the tire has been heated, one part may be pushed over the other until the said recess and the said projection coincide and that after the cooling of the tire has taken place the projection will become clamped in the recess, substantially as described.

4. A wheel as claimed in claim 1 in which the resilient action of the hub and the wheel is sustained by elastic rings, substantially as described.

5. A wheel as claimed in claim 1, in which the resilient action of the hub and the wheel is sustained by elastic rings, the ring thereof inserted between the tire and the rim being so resilient that it prevents not only tangential relative motion between tire and disc, but also provides radial elasticity substantially as described.

6. A wheel as claimed in claim 1, in which the resilient action of the hub and the wheel is sustained by elastic rings, the ring thereof inserted between the tire and the rim being so resilient that it prevents not only tangential relative motion between tire and disc, but also provides radial elasticity, said ring having such a cross-section that it may be expanded radially and elastically on its inner side and depressed on its outside so as to abut resiliently against the tire and the disc rim when forced between said parts, the tire and the rim being assembled with or without radial play, substantially as described.

7. A wheel as claimed in claim 1, in which the rim of the wheel is provided with depressions adapted to act resiliently, for the purpose of assisting the annular spring action of the disc rim, substantially as hereinbefore described.

8. A wheel as claimed in claim 1 in which a plurality of springs are interposed beneath the tire and the disc rim.

In testimony whereof I have affixed my signature.

ERNST KREISSIG.